United States Patent [19]
Alberts et al.

[11] 4,368,290
[45] Jan. 11, 1983

[54] ORGANOPOLYSILOXANE-POLYETHER-VINYL GRAFT COPOLYMERS

[75] Inventors: Heinrich Alberts; Hans Friemann; Hans-Heinrich Moretto, all of Cologne; Hans Sattlegger, Odenthal, all of Fed. Rep. of Germany

[73] Assignee: Bayer Aktiengesellschaft, Leverkusen, Fed. Rep. of Germany

[21] Appl. No.: 207,043

[22] Filed: Nov. 14, 1980

[30] Foreign Application Priority Data

Nov. 28, 1979 [DE]  Fed. Rep. of Germany ....... 2947963

[51] Int. Cl.³ ..................... C08L 51/08; C08L 83/10
[52] U.S. Cl. ........................... 525/29; 525/404; 525/445; 525/479; 528/26; 528/29; 528/25
[58] Field of Search ............... 525/404, 479, 445, 29; 528/26, 29

[56] References Cited

U.S. PATENT DOCUMENTS 3,478,075  11/1969  Jack et al. ............... 525/404
3,531,424  9/1970   Swanson ................. 525/479
4,161,468  7/1979   Davis et al. ............ 525/404

Primary Examiner—Wilbert J. Briggs, Sr.
Attorney, Agent, or Firm—Sprung, Horn, Kramer & Woods

[57] ABSTRACT

A graft copolymer comprising (I) as a first polymeric moiety an organopolysiloxane with OH functional groups, (II) as a second polymeric moiety a polyether, and (III) units of vinyl monomer which have been polymerized in the presence of mixtures of the first and second polymeric moieties which moieties are linked via vinyl polymer bridges, is produced by polymerizing a suitable monomer dispersion. The product is suited for replacing all or some of the organopolysiloxane component in room temperature curable compositions containing organopolysiloxanes, silane cross-linking agents and a curing catalyst.

9 Claims, No Drawings

ORGANOPOLYSILOXANE-POLYETHER-VINYL GRAFT COPOLYMERS

The invention relates to stable co-grafted polymer dispersions which can be cured at room temperature and consist of organopolysiloxanes with terminal OH functional groups and, if appropriate, other polydiorganosiloxanes, polyethers and, if appropriate, polyesters, and vinyl polymers, a process for their preparation and the use of these co-grafted polymer dispersions.

Polymer systems which are based on organopolysiloxanes and are cured at room temperature are known (compare W. Noll, Chemie und Technologie der Silikone (Chemistry and Technology of the Silicones), Verlag Chemie GmbH., 1968, page 391 et seq.).

It is also possible, and known, to prepare modified organopolysiloxanes by various procedures. Grafted polymers of organosiloxanes and vinyl polymers are described, for example, in British Patent Specifications Nos. 766,528, 806,582 and 869,482 and in German Auslegeschrift No. 1,694,973. The use of organopolysiloxanes with an organic chain grafted on and at most 25% of aryl radicals in 1- or 2-component compositions which are cured at room temperature is described in German Auslegeschrift No. 1,694,973. It is stated that the hydroxypolysiloxanes employed according to the invention contain in each case up to at most 25% of aryl radicals.

It is also stated that the organic chain grafted on is formed by polymerized units of vinyl monomers, preferably styrene or acrylates.

In addition to the organopolysiloxanes modified by grafting, systems in which an unsaturated polyester is co-condensed with an organopolysiloxane containing functional groups are also known. The resulting cocondensate is dissolved in a vinyl monomer and the system is cured by means of free radicals. Cured resins which consist of an unsaturated polyester to the extent of 25–75% by weight, a vinyl polymer to the extent of 25–75% by weight and a siloxane component to the extent of 0.5 to 30% by weight, are described, for example, in British Patent Specification No. 801,529. Such compositions, which are cured during the vinyl polymerization by the crosslinking reaction between the unsaturated polyester/organosiloxane cocondensate and form crosslinked and insoluble shaped articles, are unsuitable for the preparation of organosiloxane compositions which are cured at room temperature.

Aliphatic polyethers are important industrial starting materials for, for example, polyurethanes and elastomers. Mixtures of such polyethers and organopolysiloxanes are unstable and cannot be stored since the incompatible phases separate shortly after being mixed.

Polyurethane foams and thermoplastics and elastomers which contain polyether units are high-grade construction materials for use in contact with chemicals. High elasticity and flexibility, even at low temperatures, are ensured by the incorporated polyether segments. Although it would be desirable for the excellent technological properties of the polyether units also to be utilized for the preparation of novel organopolysiloxane elastomers, this has not yet been possible. There was also the desire to provide highly effective plasticizers for organopolysiloxane elastomers based on polyethers.

The object of the invention was thus to provide compatible multi-phase systems of organopolysiloxanes and polyethers, the phases of which are stable.

The object was achieved by a process in which mixtures of organopolysiloxanes, polyethers and vinyl monomers are subjected to free radical polymerization. Stable dispersions which consist of a polyether component, an organopolysiloxane and polymerized units of one or more vinyl monomers and which are characterized in that they contain grafted polymers, crosslinked via polymerized units of the vinyl monomers employed, of the organopolysiloxane and of the polyether employed are obtained.

The invention thus relates to co-grafted polymer dispersions, which are characterized in that they contain organopolysiloxanes with OH functional groups and, if appropriate, other polydiorganosiloxanes, polyethers, and vinyl monomer units polymerized in the presence of mixtures of these organopolysiloxanes and polyethers, and organopolysiloxane and polyether components linked via vinyl polymer bridges.

In particular, the invention relates to co-grafted polymer dispersions comprising about I. 10–90% by weight of organopolysiloxanes with terminal OH functional groups, II. 5–85% by weight of aliphatic polyethers, III. 0–40% by weight of aliphatic or mixed aliphatic-aromatic polyesters and IV. 5–85% by weight of polymerised units of vinyl compounds.

Advantageously, it comprises polymerized units of vinyl esters, β-unsaturated carboxylic acids, derivatives of β-unsaturated mono- or di-carboxylic acids, vinylaromatic compounds, such as styrene, α-methylstyrene or 4-chlorostyrene, α-olefins, such as ethylene, propylene, 1-butene or isobutylene, halogenated vinyl monomers, such as vinyl chloride, vinylidene chloride, vinyl fluoride, vinylidene fluoride, tetrafluoroethylene or trifluorochloroethylene, vinyl ethers, such as ethyl vinyl ether or n-butyl vinyl ether, allyl compounds, such as allyl alcohol, allyl acetate, allyl carbonates, diallyl carbonate or diallyl phthalate, divinyl compounds, such as divinylbenzene or divinyl ether, or (meth)acrylic acid esters of polyhydric alcohols, or mixtures of these monomers.

Advantageously, at least about 5% of the polymer comprises polymerized units of alkyl (meth)acrylates with 1–8 C atoms in the alkyl component, (meth)acrylamide, N-alkyl-substituted (meth)acrylamides or (meth)acrylonitrile or mixtures thereof.

Preferred copolymers comprise about I. 30–80% by weight of organopolysiloxanes with terminal OH functional groups, II. 10–60% by weight of aliphatic polyethers, III. 0–40% by weight of aliphatic or mixed aliphatic-aromatic polyesters and IV. 10–60% by weight of polymerized units of vinyl acetate or of (a) 5–90% by weight of styrene, (b) 10–95% by weight of alkyl (meth)acrylates with 1–8 C atoms in the alkyl component and (c) 0–85% by weight of (meth)acrylonitrile.

Another preferred copolymer comprises about I. 5–60% by weight of organopolysiloxanes with terminal OH functional groups, II. 0–30% by weight of organopolysiloxanes with trimethylsilyl end groups, III. 5–60% by weight of aliphatic polyethers, IV. 0–40% by weight of aliphatic or mixed aliphatic aromatic polyesters and V. 5–60% by weight of polymerized vinyl monomer units.

The invention also relates to a process for the preparation of co-grafted polymer dispersions, characterized in that mixtures of about I. 8–90% by weight of organopolysiloxanes with terminal OH functional groups, II. 0–40% by weight of organopolysiloxanes with methyl end groups, III. 4.999–85% by weight of aliphatic polyethers, IV. 0–40% by weight of aliphatic or mixed aliphatic-aromatic polyesters, V. 5–85% by weight of one or more vinyl monomers and VI. 0.001–2% by weight of one or more agents which form free radicals, are subjected to a polymerization reaction at temperatures between room temperature and 250° C.

The invention furthermore relates to organopolysiloxane compositions which can be crosslinked at room temperature and which contain co-grafted polymer dispersions and, in addition, crosslinking agents, curing catalysts, fillers and, if appropriate, other additives.

The invention also relates to the use of organopolysiloxane compositions which can be crosslinked at room temperature and which contain the co-grafted polymer dispersions according to the invention as one- or two-component systems for sealing compositions.

The co-grafted polymer dispersions are prepared by a procedure in which mixtures of an organopolysiloxane with terminal OH functional groups, an aliphatic polyether and, if appropriate, a polyester, and one or more vinyl monomers are brought, in the presence of an agent which forms free radicals, to a reaction temperature which triggers off the polymerization. If desired, mixtures of organopolysiloxanes with terminal OH functional groups and organopolysiloxanes with no functional groups can also be introduced into the reaction mixture. The polymerization can be carried out by a continuous or discontinuous process. In principle, the components to be reacted can be added in any desired sequence, but the best results are achieved if mixtures of the siloxane and polyether components and the vinyl monomers are employed simultaneously in carrying out the polymerization reaction.

The organopolysiloxanes with terminal OH functional groups are essentially linear and are represented by the following formula:

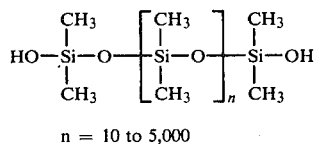

n = 10 to 5,000

Up to 30 mol % of the methyl groups may be replaced by ethyl groups, vinyl groups or phenyl groups, but methyl-substituted organopolysiloxanes are preferably employed.

The aliphatic polyethers employed for the co-grafting polymerization as a rule have two to eight, preferably two to three, hydroxyl groups, and are prepared, for example, by self-polymerization of epoxides, such as ethylene oxide, propylene oxide, butylene oxide, tetrahydrofuran, styrene oxide or epichlorohydrin, for example in the presence of BF$_3$, or by addition of these epoxides, if appropriate as a mixture or successively, onto starting components with reactive hydrogen atoms, such as alcohols or amines, for example water, ethylene glycol, propylene 1,3-glycol or 1,2-glycol, trimethylolpropane, 4,4'-dihydroxydiphenylpropane, aniline, ammonia, ethanolamine or ethylenediamine. Sucrose polyethers, such as are described, for example, in German Auslegeschriften Nos. 1,176,358 and 1,064,938, can also be used according to the invention. Those polyethers which contain predominantly primary OH groups (up to 90% by weight, relative to all the OH groups present in the polyether) are frequently preferred. Polyethers modified by vinyl polymers, such as, for example, the polyethers formed by polymerization of styrene or acrylonitrile in the presence of polyethers (U.S. Pat. Nos. 3,383,351, 3,304,273, 3,523,093 and 3,110,695 and German Patent Specification No. 1,152,536), are also suitable, as are polybutadienes containing OH groups.

Amongst the polythioethers, the products of self-condensation of thiodiglycol and/or of condensation of thiodiglycol with other glycols, dicarboxylic acids, formaldehyde, aminocarboxylic acids or aminoalcohols may be mentioned in particular. The products are mixed polythioethers, polythioether-esters or polythioether-ester-amides, depending on the co-components.

The aliphatic or mixed aliphatic-aromatic polyesters employed for the co-grafting polymerization are prepared in a manner which is known per se, by an esterification or trans-esterification reaction of mixtures of aliphatic or aromatic dicarboxylic acids or anhydrides or esters thereof and aliphatic dialcohols; compare Ullmanns Enzyklopädie der technischen Chemie (Ullmann's Encyclopaedia of Industrial Chemistry), Volume 14, Urban and Schwarzenberg, Munich, 1963, page 880 et seq.

The dicarboxylic acids employed are preferably adipic acid, sebacic acid, terephthalic acid, phthalic acid, isophthalic acid, maleic acid, fumaric acid and itaconic acid; the polyhydric alcohols employed are preferably ethylene glycol, propane-1,2-diol and -1,3-diol, butane-1,3-diol and -1,4-diol, hexane-1,6-diol, 2,2-dimethylpropane-1,3-diol and polyethylene glycols and polypropylene glycols, or polyhydric aliphatic alcohols which contain 2–7 ether atoms in the molecule (compare German Auslegeschrift No. 1,054,620).

Carboxylic acids or alcohols with a higher number of functional groups are employed for branched polyesters, examples which may be mentioned being glycerol, 1,1,1-trimethylolpropane, hexanetriol and pentaerythritol (compare, for example, German Patent Specification No. 1,105,160 and German Auslegeschrift No. 1,029,147). The molecular weights of the polyesters are in general between 800 and 10,000, but can also be considerably higher, and the OH numbers are between about 0.1 and 80. The residual water contents of the polyesters are in general less than 0.1%. If desired, it is also possible to employ particular high-molecular polyesters, for example with a narrow molecular weight distribution, which are obtained by polymerization of lactones, such as, for example, β-propiolactone, γ-butyrolactone or ε-caprolactone, or which have been synthesized by copolymerization of epoxides with cyclic anhydrides; compare K. Hamann, Makrom. Chem. 51 (1962) 53 and R. F. Fischer, J. Poly. Sci. 44 (1960) 155.

Polycarbonates or mixed ester/polycarbonates, which can be obtained by a trans-esterification reaction with, for example, diphenyl carbonate, are also suitable polyesters in the context of the invention, examples which may be mentioned being butylene glycol polycarbonate and hexane-1,6-diol polycarbonate. Corresponding purely aliphatic polycarbonates can also be obtained by ring-opening polymerization of, for example, glycol carbonate or by copolymerization of epoxides with carbon dioxide.

The OH functional groups of the polyethers or polyesters employed can be acylated or urethanized, by reaction with mono-, di- or poly-isocyanates, before, during or after the preparation of the co-grafted polymer dispersions. The acylation can be carried out with carboxylic acids, carboxylic acid halides or carboxylic acid anhydrides. Trans-esterification with carboxylic acid esters or carbonates is, of course, also possible. The acylation is preferably carried out with acetic anhydride. The urethanization can in principle be carried out with the isocyanates known in the art. Preferred isocyanates are phenyl isocyanate, cyclohexyl isocyanate, alkyl isocyanates, such as methyl, ethyl, propyl, isopropyl or butyl isocyanate, methoxymethyl isocyanate, 1,4-toluylene diisocyanate, 1,2-toluylene diisocyanate, hexamethylene diisocyanate and isophorone diisocyanate.

Examples of vinyl monomers which may be mentioned are: olefins, such as ethylene, propylene and isobutylene, vinyl esters of aliphatic or aromatic carboxylic acids, preferably vinyl acetate and vinyl propionate, $\beta$-unsaturated mono- or di-carboxylic acids and derivatives thereof, of which there may be mentioned (meth)acrylic acids, methyl (meth)acrylate, ethyl (meth)acrylate, propyl or isopropyl (meth)acrylate, n-butyl, iso-butyl or tert.-butyl (meth)acrylate, 2-ethylhexyl (meth)acrylate, (meth)acrylamide, N-alkyl-substituted (meth)acrylamide derivatives, (meth)acrylonitrile, maleic anhydride, maleamide, N-alkyl-maleimides and maleic acid half-esters or di-esters, vinyl-aromatic compounds, such as styrene, $\alpha$-methylstyrene and 4-chlorostyrene, vinyl chloride, vinylidene chloride, vinylidene fluoride, tetrafluoroethylene and vinyl ethers, such as ethyl vinyl ether or n-butyl vinyl ether; and from the series of allyl compounds there may be mentioned allyl alcohol, allyl acetate, 1,3-diacetoxy-2-methylenepropane, 2-methylenepropane-1,3-diol, allyl ethyl carbonate and allyl phenyl carbonate. If crosslinking or an increase in the molecular weights of the vinyl resin phase is desired, divinyl compounds or diallyl compounds can be employed. Such compounds which may be mentioned are divinylbenzene, (meth)acrylic acid esters of polyhydric alcohols, such as, of example, ethylene glycol dimethacrylate and diethylene glycol diacrylate, and divinyl ether.

The free radical polymerization of the vinyl monomers can be started in a manner which is known per se, with the aid of agents which form free radicals, UV-rays or $\alpha$-, $\beta$- or $\gamma$-rays or by means of heat, without further additives. Polymerization initiated by radiation is preferably carried out in the presence of sensitizers; compare, for example, B. A. D. Jenkins, A. Ledwith, Reactivity, Mechanism and Structure in Polymer Chemistry, John Wiley+Son, London, New York, 1974, page 465.

In order to start the free radical polymerization of the vinyl monomers, agents which form free radicals are added in amounts of between about 0.001 to 2, preferably 0.02 to 0.8%, by weight, relative to the total mixture of organopolysiloxane, polyester and vinyl monomer. Examples of agents which form free radicals which may be mentioned are azo initiators, such as azo-bis-isobutyronitrile (AIBN), azo-esters, azo-iminoesters or azo-N-alkylamides, peroxides, such as di-tert.-butyl peroxide, di-cumyl peroxide or di-benzoyl peroxide, peresters, such as amyl perpivalate, tert.-butyl perpivalate, tert.-butyl peroctoate, tert.-butyl perbenzoate or tert.-butyl perneodecanoate, percarbonates, such as cyclohexyl percarbonate or bisisopropyl percarbonate, and hydroperoxides, such as, for example, cumyl hydroperoxide or tert.-butyl hydroperoxide.

Other suitable initiators are benzopinacol, benzopinacol derivatives or other highly substituted ethane derivatives which are heat-labile.

The polymerization can also be started with the aid of Redox systems at temperatures lower than the temperatures at which the agents which form free radicals decompose purely thermally.

Examples of Redox initiators which may be mentioned are combinations of peroxides and amines, such as, for example, benzoyl peroxide and triethylamine, trialkyl-boron compounds and oxygen, hydroperoxides and sulphinic acids, formaldehyde or aldoses or combinations thereof and low-valent transition metal salts, and sulphur dioxide/peroxide Redox systems.

The polymerization reaction can be carried out continuously or discontinuously, under normal pressure or under reaction pressures of up to, for example, 300 bars, preferably up to 15 bars, and at reaction temperatures between $-20°$ C. and $+250°$ C., preferably at $70°$ to $190°$ C. If desired, the polymerization can also be carried out in the presence of solvents or diluents, of which water, alcohols, such as methanol, ethanol and tert.-butanol, aliphatic or aromatic hydrocarbons, halogenated hydrocarbons, such as chlorobenzene or fluorinated compounds, ethers, such as dioxane or tetrahydrofuran, and esters, such as, for example, ethyl acetate, may be mentioned.

The polymerization is preferably carried out, however, in the absence of a solvent.

If desired, the polymerization reaction can be carried out in the presence of agents which regulate the molecular weight. Molecular weight regulators which may be mentioned are mercaptans, such as n- or tert.-dodecylmercaptan, and thioglycol, thioglycerol or thioacetate, and furthermore sulphur-free molecular weight regulators, such as hydrocarbons, examples which may be mentioned being paraffin fractions, such as, for example, petroleum ether, light petrol or wash benzine or $\alpha$-olefins, such as, for example, propylene, isobutylene and 1-butene, and also ketones, such as, for example, acetone, methyl ethyl ketone or cyclohexanone, as well as aldehydes, such as, for example, formaldehyde, acetaldehyde, propionaldehyde or isobutyraldehyde, or allyl compounds, such as, for example, allyl alcohol, allyl acetate, 1,3-diacetoxy-2-methylenepropane or allyl carbonates. Other possible telogens are halogenated hydrocarbons, such as methylene chloride, tetrachloroethane, dibromoethane and the like. As is to be expected, the viscosities of the dispersions can be controlled with the aid of such regulators.

The reaction of the monomers employed is determined by the chosen polymerization process and the reaction conditions. In the discontinuous polymerization procedure, the object is to achieve yields which are as high as possible, so that at least 80% of the monomer employed, but preferably more than 90%, is reacted. The residual monomers are removed by known processes, by distillation under normal pressure or under reduced pressure. The residual monomer contents still effectively found in the dispersions after working up are negligibly small, and are in general less than 1,000 ppm, preferably less than 100 ppm.

If desired, antioxidants, stabilizers, UV absorbers, anti-ageing agents, plasticizers or substances having a fungistatic or bacteriostatic action can be introduced into the batch when the polymerization has ended.

The fillers usually employed in the preparation of silicone elastomers can also be used. Fillers of this type are silicas which have been prepared by various processes and have various specific surface areas.

The silicone/polyether/vinyl polymer dispersions obtained according to the invention are particularly suitable for use in 1- and 2-component compositions which are cured at room temperature. As is known, such compositions, which are cured in accordance with the condensation principle, consist of polydiorganosiloxanes with hydroxyl end groups, crosslinking agents, fillers and catalysts.

All or some of the polydiorganosiloxanes with hydroxyl end groups can be replaced by co-grafted polymer dispersions according to the invention. Silanes which have, in the molecule, at least 3 groups which can easily be split off hydrolytically, such as carboxylic acid groups, carboxamide groups, oxime groups, amine oxide groups and amine groups, are employed as the crosslinking agents. Examples of reinforcing fillers are pyrogenically produced silicon dioxide, and an example of a possible non-reinforcing filler is chalk. The catalysts used are, inter alia, organic tin compounds, such as dibutyl-tin dilaurate.

Silicone compositions in which the co-grafted polymer dispersions according to the invention are used can be covered with commercially available lacquers based, for example, on alkyd resins or polyurethanes considerably better than silicone compositions known hitherto. The silicone compositions which contain, as constituents from which they are built up, the co-grafted polymers according to the invention and which have been cured at room temperature can be lacquered in the same manner as wood. It has also been found that the adhesion of these novel systems to wood, metals and concrete is excellent, even under wet conditions.

The examples which follow illustrate the preparation of the silicone/polyether/vinyl polymer dispersions according to the invention.

Unless indicated otherwise, the amounts given are to be understood as parts by weight or percentages by weight.

Preparation of the starting substances:

The polysiloxanes with OH functional groups are prepared in a manner which is known per se (compare W. Noll, Chemie und Technologie der Silikone (Chemistry and Technology of Silicones), Verlag Chemie GmbH, Weinheim/Bergstr., 2nd edition, 1968, chapter 5, page 162 et seq.).

The polydimethylsiloxanes with OH functional groups given in the examples are characterized as follows:

| OH—polysiloxane No. | Viscosity mPas at 20° C. |
|---|---|
| 1 | 5,000 |
| 2 | 10,000 |
| 3 | 18,000 |
| 4 | 50,000 |

The polyesters are prepared by the melt condensation process, the water of reaction formed being distilled off until the OH and acid numbers have reached the desired values (compare Houben-Weyl, Methoden der Organischen Chemie (Methods of Organic Chemistry), Volume XIV/2, Georg Thieme-Verlag, Stuttgart, 1963, page 1 et seq.). The most important characteristic data of the polyethers used are summarized in Table 1:

TABLE 1

| Polyether | Composition | Characteristic data |
|---|---|---|
| A | Polyethylene glycol | Melting point: 58–60° C. OH number: about 5 |
| B | Trifunctional copolyether of propylene oxide and ethylene oxide | Viscosity: 520 mPas OH number: 49 |
| C | Trifunctional polyether containing propylene oxide blocks and polyethylene oxide blocks | Viscosity: 1,100 mPas OH number: 28 |

TABLE 2

| Polyester | Composition of the polyester | OH number | Acid number |
|---|---|---|---|
| A | Adipic acid and diethylene glycol | 40 | 1 |
| B | Adipic acid, ethylene glycol and butane-1,4-diol | 55 | 1 |
| C | Hexanediol polycarbonate | 58 | 0.1 |
| D | Phthalic acid, isophthalic acid, ethylene glycol and neopentylglycol | 120 | 18 |
| E | as B | 19.5 | 1 |
| F | Phthalic acid, maleic acid, propane-1,2-diol and dipropylene glycol | 34 | 20 |

EXAMPLE 1

300 g of polysiloxane 1, 50 g of polyether A and 150 g of polyether B are warmed under nitrogen to 110° C. in a 2 l stirred kettle. A solution of 100 g of polysiloxane 1, 200 g of vinyl acetate and 1.125 g of tert.-butyl perpivalate is then added in the course of 2 hours. The mixture is then subsequently stirred for 1 hour. The volatile constituents are stripped off in vacuo at 110° C.–130° C. A homogeneous, fine-particled co-grafted polymer dispersion with a viscosity of 58,000 mPas and the following composition is obtained: 51.6% by weight of polysiloxane, 25.9% by weight of polyether and 22.5% by weight of polymerized vinyl acetate units.

The compositions prepared by the process described here were mixed and cured, in the presence of atmospheric moisture, with the aid of crosslinking agents and catalysts which promote crosslinking, according to the following recipe: 200 g of co-grafted polymer, 10.4 g of a titanium complex of the following approximate composition:

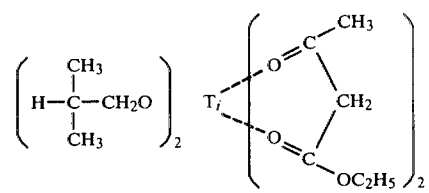

11.4 g of bis-(N-methylbenzamido)-ethoxymethylsilane and 2.2 g of dibutyl-tin diacetate.

The crosslinked products are elastic and free from tackiness. They were coated with a commercially available alkyd lacquer, the adhesion of which to the silicone was determined after 7 days with the aid of the cross-hatch test, by cutting a 2.54 cm square on the lacquered surface into 100 square pieces of equal size with a razor blade, so that a painted surface with a grid-like appearance is obtained. A strip of adhesive tape (Tesafilm No. 101 from Messrs. Beiersdorf AG, Hamburg) is then pressed firmly onto this grid. Thereafter, the strip of adhesive tape is removed by being slowly pulled off at an angle of about 30° C. The percentage value of the retention of the lacquer is obtained from the number of painted square pieces which remain on the cured formulation after the strip of adhesive tape has been removed. The physical properties and the results of the cross-hatch test can be seen from the following table. For comparison Examples 2 and 3, polydimethylsiloxanes with hydroxyl end groups are employed instead of the co-grafted polymer dispersion, the polydimethylsiloxane in Example 2 having a viscosity of 5 Pas and that in Example 3 having a viscosity of 50 Pas.

| Example No. | Evenness of lacquer | Adhesion of lacquer % | E modulus (100% elongation) $N/mm^2$ | Tensile strength $N/mm^2$ | Elongation at break % |
|---|---|---|---|---|---|
| 1 | good | 92.5 | 0.192 | 0.534 | 483 |
| 2 (comparison) | poor | 0 | 0.141 | 0.299 | 295 |
| 3 (comparison) | poor | 18 | 0.097 | 0.313 | 544 |

EXAMPLE 4

1,600 g of polysiloxane 1 and 1,000 g of polyether B are warmed under nitrogen to 110° C. in a 6 l stirred kettle. A solution of 6 g of azobisisobutyric acid diethyl ester in 1,000 g of vinyl acetate is added at this internal temperature in the course of 2 hours. The mixture is then subsequently stirred at 110° C. for 1 hour. Volatile constituents are stripped off in vacuo at 110°-130° C. A homogeneous dispersion with the following composition is obtained: 45.5% by weight of polysiloxane, 28.4% by weight of polyether and 26.1% by weight of polymerized vinyl acetate units. The dispersion has a viscosity of 45,000 mPas.

The co-grafted polymer dispersion is crosslinked and the adhesion of lacquer is tested by the process described in Example 1. Result: adhesion of the lacquer: 100%; evenness of the lacquer: good.

EXAMPLE 5

1,600 g of polysiloxane 1 and 1,000 g of polyether B are warmed under nitrogen to 110° C. in a 6 l stirred kettle. A solution of 1,000 g of vinyl acetate, 400 g of polysiloxane 1, 6.0 g of tert.-butyl perpivalate and 3.0 g of tert.-dodecylmercaptan is added dropwise at an internal temperature of 110° C. in the course of 2 hours. The batch is subsequently stirred at 110° C. for 2 hours. The volatile constituents are distilled off in vacuo at 110° C.-130° C. The resulting co-grafted polymer dispersion has a viscosity of 48,000 mPas and the following composition: 53.4% by weight of polysiloxane, 26.7% by weight of polyether and 19.9% by weight of polymerized vinyl acetate units. Some of the co-grafted polymer dispersion is crosslinked by the procedure given in Example 1. A sample lacquering resulted in a good evenness of the lacquer. The sample had the following characteristic mechanical values:

E modulus (100% elongation): 0.165 $N/mm^2$
Tensile strength: 0.461 $N/mm^2$
Elongation at break: 509%

EXAMPLES 6-7

A. Preparation of a grafting dispersing agent: 400 g of polysiloxane 1, 400 g of polyether B and 50 g of cyclohexyl isocyanate are warmed to 200° C. for 4 hours, while stirring. After cooling, the reaction product is employed for the preparation of the co-grafted polymer dispersion of Example 7.

B. Preparation of the co-grafted polymer dispersions:

The initial mixture is introduced into a 2 l stirred kettle and is heated under nitrogen to 110° C. Thereafter, solution 1 is added in the course of 2 hours and the mixture is then subsequently stirred at 110° C. for 1 hour. Residual monomers are distilled off in vacuo at 110°-130° C.

| | Initial mixture | | | Solution 1 | | Azobisisobutyric acid diethyl ester | Viscosity mPas | Composition in % by weight | | | |
|---|---|---|---|---|---|---|---|---|---|---|---|
| Example | Polysiloxane 1 | Polyether B | Grafting dispersing agent | Vinyl acetate | Polysiloxane | | | Polysiloxane | Polyether | Grafting dispersing agent | Polymerized vinyl acetate units |
| 6 | 400 | 200 | — | 250 | 100 | 1.5 | 34,300 | 54.2 | 21.6 | — | 24.2 |
| 7 | 400 | 200 | 150 | 250 | 100 | 1.5 | 28,300 | 46.9 | 18.8 | 14.1 | 20.2 |

The co-grafted polymer dispersions were crosslinked by the process described in Example 1. A test piece was coated with an alkyd lacquer and there were no interruptions in the evenness of the lacquer (evenness: "good").

The crosslinked samples had the following mechanical strength values:

| Example | E modulus 100% elongation $N/mm^2$ | Tensile strength $N/mm^2$ | Elongation at break % |
|---|---|---|---|
| 6 | 0.109 | 0.199 | 309 |
| 7 | 0.092 | 0.261 | 476 |

EXAMPLE 8

200 g of polysiloxane 1 are heated to 150° C., while passing over nitrogen, in a 2 l stirred kettle. The following two solutions are then simultaneously added in the course of 2 hours:

Solution 1: 200 g of polyether B, 100 g of styrene and 100 g of n-butyl acrylate
Solution 2: 200 g of polysiloxane 1 and 2.0 g of tert.-butyl peroctoate The mixture is then subsequently stirred at 150° C. for 1 hour. The volatile constituents are stripped off in vacuo at 150° C.–130° C. A dispersion with a viscosity of 30,300 mPas and the following composition is obtained: 51.1% by weight of polysiloxane, 25.6% by weight of polyether, 11.6% by weight of polymerized styrene units and 11.7% by weight of polymerized n-butyl acrylate units. Some of the co-grafted polymer dispersion was crosslinked according to the instructions in Example 1 and, after complete curing, was lacquered. The evenness of the lacquer was good.

EXAMPLES 9–10

The initial mixture was introduced into a 6 l stirred kettle and was warmed under nitrogen to 110° C. The solution was added in the course of 2 hours and the mixture was subsequently stirred at 110° C. for 1 hour. The residual monomers were stripped off in vacuo at 110°–120° C.

|  | Initial mixture | | | Solution | | | | Composition in % by weight | | | |
|---|---|---|---|---|---|---|---|---|---|---|---|
| Example | Poly-siloxane 1 | Poly-ether C | Acetic anhydride | Vinyl acetate | Poly-siloxane 1 | Tert.-butyl perpivalate | Viscosity mPas | Poly-siloxane | Poly-ether | Acetylated poly-ether | Poly-vinyl acetate |
| 9 | 1,600 | 1,000 | — | 1,000 | 400 | 8.0 | 50,500 | 52.2 | 26.1 | — | 21.7 |
| 10 | 1,600 | 1,000 | 75 | 1,000 | 400 | 8.0 | 44,400 | 52.1 | — | 27.0 | 20.9 |

Portions of each of the co-grafted polymer dispersions were crosslinked according to the instructions in Example 1 and, after complete curing, were lacquered. The evenness of the lacquer was good in both cases.

It will be understood that the specification and examples are illustrative but not limitative of the present invention and that other embodiments within the spirit and scope of the invention will suggest themselves to those skilled in the art.

We claim:

1. A room temperature curable graft copolymer comprising (I) as a first polymer an organopolysiloxane with OH functional groups, (II) as a second polymer a polyether, and (III) units of vinyl monomer which have been polymerized in the presence of mixtures of the first and second polymers which polymers are thereafter linked via vinyl polymer bridges.

2. A graft copolymer according to claim 1, comprising by weight about 10–90% of an organopolysiloxane with terminal OH functional groups, 5–85% of aliphatic polyethers, 0–40% of aliphatic or mixed aliphatic-aromatic polyesters, and 5–85% of polymerized units of vinyl compounds.

3. A graft copolymer according to claim 1, wherein the vinyl compound is at least one member selected from the group consisting of vinyl esters, β-unsaturated carboxylic acids, derivatives of α,β-unsaturated mono- or di-carboxylic acids, vinyl-aromatic compounds, α-olefins, vinyl ethers, halogenated vinyl monomers, allyl compounds, divinyl compounds and (meth)acrylic acid esters of polyhydric alcohols.

4. A graft copolymer according to claim 1, wherein the vinyl compounds in the polymer comprise by weight up to about 85% of polymerized vinyl acetate units and 5–85% of polymerized units of alkyl (meth)acrylates with 1–8 C atoms in the alkyl component, (meth)acrylamide, N-alkyl-substituted (meth)acrylamides or (meth)acrylonitrile or mixtures thereof.

5. A graft copolymer according to claim 1, comprising by weight about 30–80% of an organopolysiloxane with terminal OH functional groups, 10–60% of an aliphatic polyether, 0–40% of an aliphatic or mixed aliphatic-aromatic polyester and 10–60% of polymerized units of (a) 5–90% by weight of styrene, (b) 10–95% by weight of alkyl (meth)acrylates with 1–8 C-atoms in the alkyl component and (c) 0–85% by weight of (meth)acrylonitrile.

6. A graft copolymer according to claim 1, comprising by weight about 30–80% of an organopolysiloxane with terminal OH functional groups, 10–60% of an aliphatic polyether, 0–40% of an aliphatic or mixed aliphatic-aromatic polyester, and 10–60% of polymerized vinyl acetate units.

7. A graft copolymer according to claim 1, comprising by weight about 5–60% of an organopolysiloxane with terminal OH functional groups, 0–30% of an organopolysiloxane with trimethylsilyl end groups, 5–60% of an aliphatic polyether, 0–40% of an aliphatic or mixed aliphatic-aromatic polyester, and 5–60% of polymerized vinyl monomer units.

8. Process for the preparation of a graft copolymer according to claim 1 comprising polymerizing at a temperature from room temperature to about 250° C. a mixture comprising by weight about 8–90% of an organopolysiloxane with terminal OH functional groups, 0–40% of an organopolysiloxane with methyl end groups, 4.999–85% of an aliphatic polyether, 0–40% of an aliphatic or mixed aliphatic-aromatic polyester, 5–85% of at least one vinyl monomer, and 0.001–2% of at least one agent which forms free radicals.

9. In a room temperature curable composition comprising an organopolysiloxane, a silane having in its molecule at least 3 groups which can readily be split off hydrolytically as cross-linking agent, and a cross-linking catalyst, the improvement wherein the organopolysiloxane at least in part comprises a copolymer according to claim 1.

* * * * *